United States Patent Office 3,241,812
Patented Mar. 22, 1966

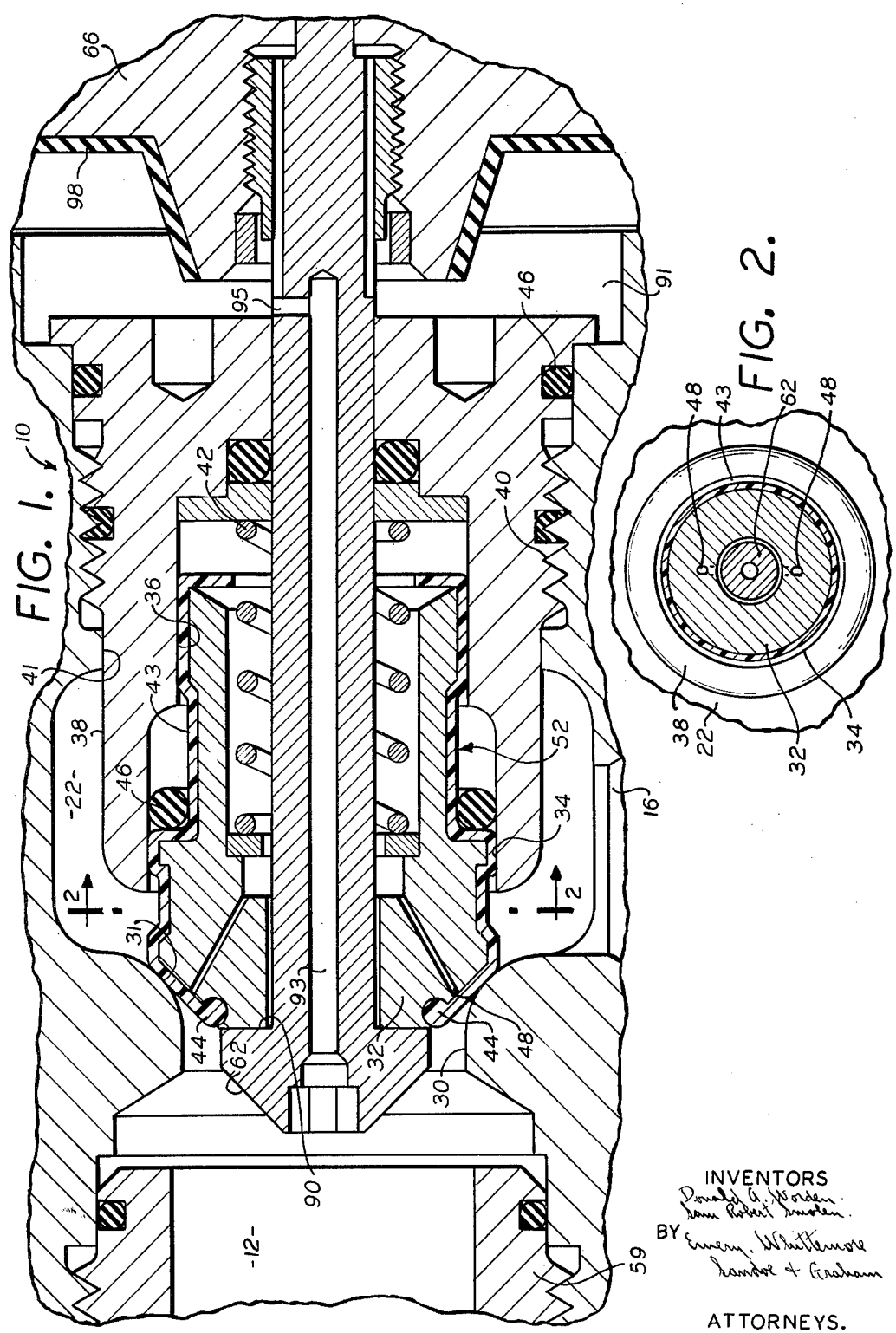

3,241,812
VALVE ASSEMBLY WITH COVERED
VALVE HEAD
Donald A. Worden, Pompton Plains, and Sam Robert Smolen, Bloomingdale, N.J., assignors to Marotta Valve Corporation, Boonton, N.J., a corporation of New Jersey
Original application Aug. 29, 1960, Ser. No. 52,529, now Patent No. 3,181,560, dated May 4, 1965. Divided and this application Dec. 2, 1964, Ser. No. 415,248
9 Claims. (Cl. 251—357)

This application is a division of application Serial No. 52,529, filed August 29, 1960, now Patent No. 3,181,560, issued May 4, 1965.

This invention relates to valves. Although intended primarily for pressure relief valves, and for valves that have sensing pressure chambers, some features of the invention are applicable to valves generally.

One object of the invention is to provide a valve assembly having plastic coated parts for improving the operating characteristics of the valve and for obtaining the advantages of plastic parts without the dimensional variations that result from moisture absorption and temperature changes of solid plastic parts. This is particularly important in relief valves and in pressure regulators where the reductions in pressure cause drop in temperature, sweating of the parts, and moisture absorption.

The plastic coated valve of this invention is used against metal valve seats, or other hard seats, and it obtains sealing at lower pressures than hard valve elements and seats, but without the limited mechanical strength of plastic seats.

Other objects, features and advantages of the invention will appear or be pointed out as the description proceeds.

In the drawing, forming a part hereof, in which like reference characters indicate corresponding parts in all the views:

FIGURE 1 is a fragmentary sectional view showing a valve made in accordance with this invention; and FIGURE 2 is an enlarged sectional view taken on the line 2—2 of FIGURE 1.

FIGURE 1 shows a valve assembly having a housing 10 with two fluid passages opening through the wall of the housing. These passages include an inlet passage 12, and a vent passage 16. Within the housing 10, there is a chamber 22 with which the passage 16 communicates.

The inlet passage 12 and the chamber 22 are separated by a partition 30 having an opening through it surrounded by a tapered valve seat 31. There is a valve element 32 in the chamber 22 with a tapered face that seats against the tapered seat 31. This valve element 32 slides in guides 34 and 36 in a fitting 38 which screws into a bore 40 in the housing 10. The fitting 38 is held in a centered position with respect to the valve seat 26, by an unthreaded portion 41 of the bore 40 which contacts with a cylindrical portion of the fitting 38 ahead of the threads.

A helical spring 42 compressed between the end of the fitting 38 and a back surface of the valve element 32 urges the valve element 32 into closed position in which it contacts with the tapered seat 31.

The valve element 32 is made of hard material, and preferably metal, and it is coated with a soft material, preferably a thermoplastic 43, such as nylon. This plastic material has a degree of resilience and it fits the valve element 32 like a glove. Nylon material is preferably under tension so as to obtain a tight fit.

In order to have metal-to-metal contact between the valve element 32 and its actuator, the plastic material 43 does not extend all the way across the end face of the valve element 32. There is an annular groove in the valve element 32 and a bead 44 at the end of the plastic material 43 fits into the groove and anchors the plastic material to the valve element 32.

The circumferential side wall of the valve element 32 is of different diameters at different regions along its axial length, and at some places its diameter is less than the diameter near the front face of the valve element so as to give the plastic coating 43 a tighter grip on the valve element. An O-ring can be used around the valve element behind a shoulder where the diameter of the valve element becomes smaller.

Although plastic valves and valve seats have important advantages in obtaining tight sealing at lower pressure than are required for metal-to-metal contacts, large volumes of plastic, such as are encountered with solid plastic valves, have been unsatisfactory in precision valves because of variations in the size of the plastic valves with changes in moisture and heat. A nylon valve will grow as much as 7% as the result of moisture absorption. With this invention, however, the plastic is a coating on the metal valve and this keeps the volume of plastic within reasonable limits so that any changes in dimensions are very small and not sufficient to adversely affect the operation.

In order to obtain good adherence of the plastic coating on the metal valve element, a fluidized process is used to apply the plastic. The valve element is placed in powdered plastic and the powder tends to enter any crevices in the surface of the metal part. The valve element is hot when inserted in the powder and the heat melts the powder which contacts with the surface of the valve element because the plastic used is of the thermoplastic type. By controlling the heat and the length of time that the valve element remains in the powdered plastic, a coating of the desired thickness can be built up on the metal surface of the valve element, and after cooling, this coating is machined to accurate dimensions. The cooling causes the plastic material to shrink so that it provides a prestressed coating which fits the valve element like a tight glove.

The plastic coating on the metal valve element of this invention is particularly advantageous for a relief valve or in a pressure regulator, because the pressure drop in such apparatus causes the gas to cool and this cooling is often below the dew point so that there is sweating of the valve element. Accumulation of such moisture on a solid plastic valve will cause change in dimensions of the valve with resulting change in the diameter of the portion of the valve behind the passage which the valve seals. This interferes with the compensation of the valve since an increase in diameter beyond the valve seat tends to interfere with the relative areas which result in the desired counterbalancing. Changes in dimensions also influence the clearance of the valve element in the guides in which it moves.

The valve element 32 has passages 48 for supplying pressure to the space behind it so that it is substantially counterbalanced as to the pressure in the inlet passage 12.

The valve element 32 is moved into open position, against the force of the spring 42, by an actuator 62 which extends through an opening in the front faces of the valve element 32 and which connects at one end with an operator 66.

The actuator 62 has a shoulder 90 in position to contact with the end face of the valve element 32 when the actuator 62 moves toward the right in FIGURE 1 to open the valve element 32. The actuator 62 is moved by a piston 66 having a plastic facing 98 and located in a pressure sensing chamber 91. This chamber communicates with the inlet passage 12 through passages 93 and 95.

The preferred embodiment of the invention has been illustrated and described, but changes and modifications

What is claimed is:

1. A valve assembly including a metal valve element having a frusto-conical front end, a part of which comprises a seat portion of the valve element, an annular groove in the frusto-conical end radially inward from said seat portion, the valve element beyond the frusto-conical end extending axially and having a rearwardly facing annular surface, a plastic coating over the valve element, said coating being of softer material than the metal of the valve element and having a forward end anchored in the annular groove of the frusto-conical end, the coating beyond said groove extending across the seat portion of the valve element and axially and then radially inward across the rearwardly facing annular surface and being of substantially uniform thickness and having its rearward end behind and adjacent to the rearwardly facing annular surface.

2. The valve assembly described in claim 1 characterized by the coating being under tension both circumferentially and axially and fitting over the valve element like a glove, and a bead at the forward end of the coating fitting into the annular groove and comprising at least part of the means for anchoring the forward end of the coating in the annular groove, said groove being undercut and the bead fitting into and substantially filling the undercut groove.

3. The valve assembly described in claim 1 characterized by the front end of the valve element having an exposed surface of the metal radially inward from the coating, a metal actuator that extends through the end of the valve element, and a shoulder on the actuator in metal-to-metal contact with said exposed surface.

4. A valve assembly including a metal valve element having a frusto-conical front end, a part of which comprises a seat portion of the valve element, the valve element beyond the frusto-conical end extending axially and having a rearwardly facing annular surface, a plastic coating over the valve element, said coating being of softer material than the metal of the seat portion and having a forward end anchored to the front end of the valve element, the coating extending across the seat portion of the valve element and axially and then radially inward across the rearwardly facing annular surface, the coating being under tension both circumferentially and axially and fitting over the valve element like a glove.

5. The valve assembly described in claim 4 characterized by the coating being carried entirely by the valve element and being movable as a unit with the valve element, a housing enclosing a chamber in which the valve element is contained, a seat in the chamber and with which the valve element contacts when in closed position, a cylindrical side wall of the chamber constituting a guide for the valve element, said valve element having a portion of its axially extending length cylindrical and of slightly less diameter than the cylindrical side wall of the chamber, the coating on the valve element covering the cylindrical portion of the valve element and substantially filling the clearance between the valve element and the cylindrical side wall so that the coating comprises a bearing surface on the valve element for sliding contact with the cylindrical side wall as the valve element moves toward and from the seat in the chamber.

6. The valve assembly described in claim 5 characterized by a shoulder at one end of at least a part of the cylindrical portion of the valve element, the shoulder facing rearwardly and extending radially inward to a portion of the valve element that is of reduced diameter, and an O ring around the reduced diameter portion of the valve element and behind said shoulder.

7. The valve assembly described in claim 6 characterized by the coating being made of nylon and adhering to the surface of the valve element but being under both circumferential and axial tension.

8. A poppet valve element having an end face area for contact with a valve seat, a groove in the end of the valve element, radially inward from the area of the valve element that contacts with the seat, a plastic coating on the valve element made of resilient plastic material that has dimensional stability in the presence of moisture, the plastic being under tension both circumferentially and axially so that the coating fits the valve element like a glove, the coating having a bead at one end fitting into the groove and anchoring that end of the coating to the valve element.

9. A poppet valve element having an end face area for contact with a valve seat, a plastic coating on the valve element made of resilient plastic material that has dimensional stability in the presence of moisture, the valve element having an axially extending cylindrical portion, and the coating extending across the end face area which contacts with the valve seat and then axially along the cylindrical portion of the valve element to provide a bearing surface for contact with a guide in which the valve element is adapted to move axially, the valve element having a rearwardly facing annular surface at the end of the cylindrical portion, and the coating extending beyond the rearwardly facing annular surface and radially inward across said surface, said coating being carried entirely by the valve element and being movable as a unit with the valve element.

References Cited by the Examiner

UNITED STATES PATENTS

| | | | |
|---|---|---|---|
| 1,021,681 | 3/1912 | Jennings | 137—375 |
| 2,250,813 | 7/1941 | Rea | 251—358 |
| 2,469,109 | 5/1949 | Goecke | 137—375 |
| 2,644,664 | 7/1953 | Hansen | 137—375 X |
| 2,730,326 | 1/1956 | Staben | 251—358 |
| 2,920,861 | 1/1960 | Hartmann | 251—357 |
| 2,936,776 | 5/1960 | Veatch | 137—375 |
| 2,960,998 | 11/1960 | Sinker et al. | 251—357 X |
| 3,070,116 | 12/1962 | Noland et al. | 251—375 X |

M. CARY NELSON, *Primary Examiner.*